(12) United States Patent
Hwang et al.

(10) Patent No.: US 8,420,767 B2
(45) Date of Patent: Apr. 16, 2013

(54) POLYARLENE-BASED POLYMER, PREPARATION METHOD FOR THE SAME, AND POLYMER ELECTROLYTE MEMBRANE FOR FUEL CELL USING THE POLYMER

(75) Inventors: Inchul Hwang, Gyeonggi-do (KR); Nak Hyun Kwon, Seoul (KR); Young Taek Kim, Seoul (KR); Dong Il Kim, Incheon (KR); Ju Ho Lee, Incheon (KR); Jang-Bae Son, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/315,976

(22) Filed: Dec. 9, 2011

(65) Prior Publication Data

US 2012/0309857 A1 Dec. 6, 2012

(30) Foreign Application Priority Data

May 30, 2011 (KR) .......................... 10-2011-0051422

(51) Int. Cl.
*C08G 8/02* (2006.01)
(52) U.S. Cl.
USPC ........... 528/125; 528/171; 528/295; 528/220; 528/373; 521/27; 429/479; 429/480; 429/498; 429/493; 429/429

(58) Field of Classification Search .................. 528/125, 528/171, 295, 220, 373; 521/27; 429/479, 429/480, 498, 493, 429
See application file for complete search history.

(56) References Cited

U.S. PATENT DOCUMENTS

2009/0203806 A1* 8/2009 Liu et al. .................. 521/27

FOREIGN PATENT DOCUMENTS

| CA | 2047381 | * | 7/1991 |
| JP | 04-233939 | | 8/1992 |

* cited by examiner

*Primary Examiner* — Shane Fang
(74) *Attorney, Agent, or Firm* — Edwards Wildman Palmer LLP; Peter F. Corless

(57) ABSTRACT

Disclosed herein is a polyarylene-based polymer, a preparation method for the same, and a polymer electrolyte membrane for fuel cell using the polymer. The polyarylene-based polymer, which is designed to have long side chains of a hydrophilic moiety and dense sulfonic acid groups, may improve the formation of ion channels when fabricating a polymer membrane and also ensures good chemical stability of the hydrophilic moiety and good dimensional stability against water. Further, the preparation method of the present invention simplifies production of the polymer, and polymer electrolyte membranes using the polymer exhibits improved properties as a polymer electrolyte membrane for a fuel cell, such as high proton conductivity, even under an atmosphere of low water uptake, and good dimensional stability against a long-term exposure to water.

25 Claims, 4 Drawing Sheets

POLYARLENE-BASED POLYMER, PREPARATION METHOD FOR THE SAME, AND POLYMER ELECTROLYTE MEMBRANE FOR FUEL CELL USING THE POLYMER

CROSS-REFERENCE TO RELATED APPLICATION

This application claims under 35 U.S.C. §119(a) priority to and the benefit of Korean Patent Application No. 10-2011-0051422, filed on May 30, 2011, the entire contents of which are incorporated herein by reference.

BACKGROUND OF THE INVENTION (a) Field of the Invention

The present invention relates to a polyarylene-based polymer, a preparation method for the same, and a polymer electrolyte membrane for a fuel cell using the polymer.

(b) Description of the Related Art

A fuel cell is a device that converts chemical energy into electrical energy through an electrochemical reaction of a fuel such as, for example, hydrogen or methanol, with oxygen, air, or another oxidizing agent. The fuel cell comprises electrodes (i.e. an anode and a cathode) and an electrolyte membrane disposed between the two electrodes. This basic construction is called the "membrane-electrode assembly". The role of the polymer electrolyte membrane is to provide a means for transporting protons derived from the anode to the cathode (requiring high proton conductivity), and for separation of the anode from the cathode (requiring high dimensional stability against hydration and low methanol permeability).

The polymer electrolyte membranes (PEMs) are broadly classified into fluorinated PEMs and hydrocarbon-based PEMs. The hydrocarbon-based PEMs are prepared using polymers such as, for example, polyimide (PI), polysulfone (PSU), polyether ketone (PEK), polyarylene ether sulfone (PAES), and the like, and are generally superior to the fluorinated PEMs in terms of their low production cost and good thermal stability.

To achieve proton conductivity comparable to the level of fluorinated PEMs, hydrophilic ionic groups such as sulfonic acid groups, or the like, are introduced into the hydrocarbon-based PEMs. Unfortunately, the addition of such hydrophilic ionic groups causes an excessive swelling of the membrane with water, which deteriorates the mechanical properties and stability of the membrane and causes leakage of the sulfonated resin.

In an attempt to solve this problem, it has been proposed to introduce covalent cross-links to the resin to lower the water solubility of the electrolyte membrane, thereby inhibiting leakage of the resin. It has also been proposed to introduce sulfonic acid groups onto the side chains of the polymer, rather than the main chain, to increase the fluidity of the polymer chain and enhance the proton conductivity.

Unfortunately, the hydrocarbon-based PEMs are currently not well suited for commercial use in fuel cells because they suffer from several major drawbacks. For example, hydrocarbon-based PEMs have low proton conductivity. Additionally, it is difficult to synthesize the high molecular weight polymers with covalent cross-links and to then prepare a polymer membrane using the synthesized polymers. Another difficulty is caused by a rise of the glass transition temperature Tg, which causes the fluidity of the polymer to decrease, thereby resulting in the membrane having poor mechanical properties.

SUMMARY OF THE INVENTION

Accordingly, it is an aspect of the present invention to provide a polyarylene-based polymer that shows excellent chemical and dimensional stability, as well as high proton conductivity. The present invention also provides a method of preparing the polymer. The present invention also provides a polymer electrolyte membrane using the polymer.

In accordance with the present invention, there is provided a polyarylene-based polymer represented by the following Formula 1:

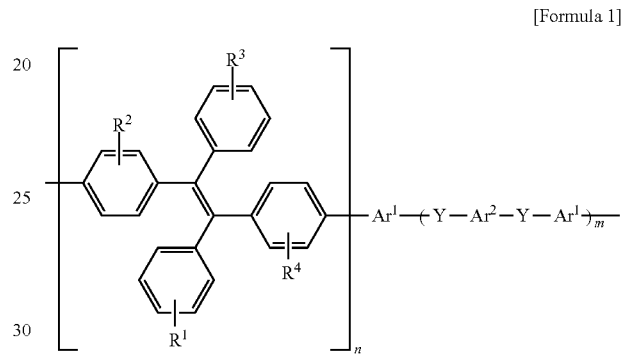

[Formula 1]

In the Formula 1, $R^1$ to $R^4$ are independently hydrogen or $-SO_3R$, where R is hydrogen, alkyl having 1 to 20 carbon atoms, alkoxy having 1 to 20 carbon atoms, aryl having 6 to 18 carbon atoms, or acyl having 1 to 20 carbon atoms;

$Ar^1$ is independently a substituent selected from the group of Formula 5a,

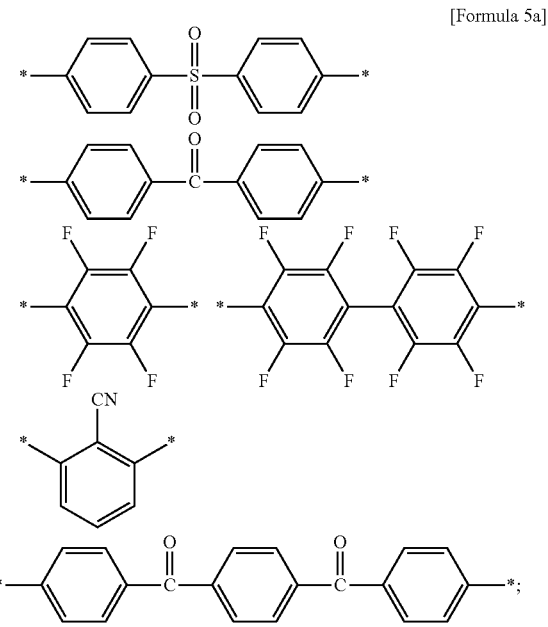

[Formula 5a]

$Ar^2$ is a substituent selected from the group consisting of the following Formula 6a,

[Formula 6a]

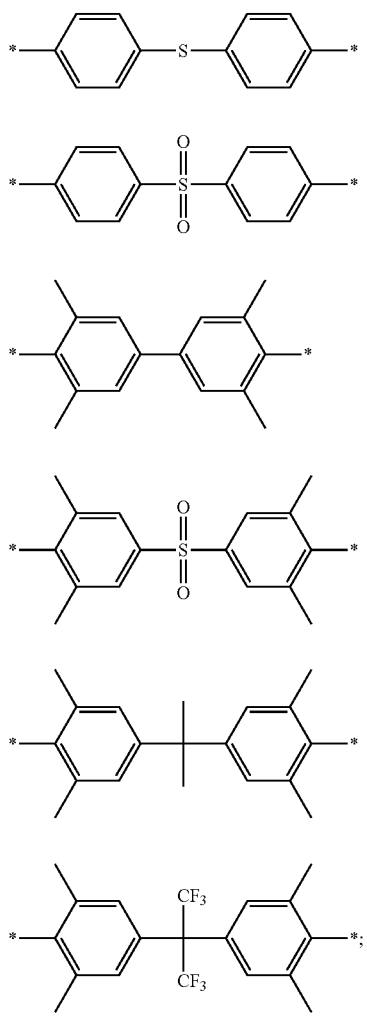

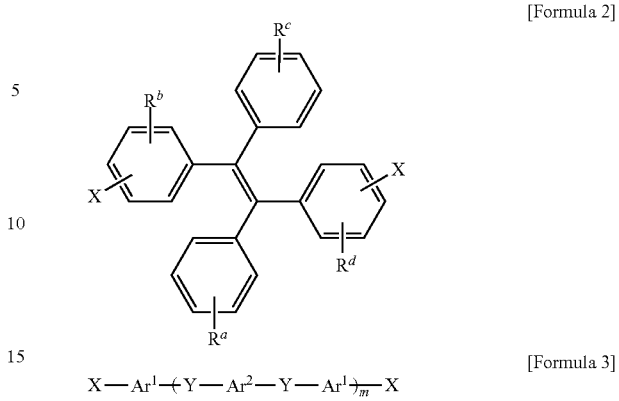

[Formula 2]

[Formula 3]

$$X—Ar^1{-}(Y—Ar^2—Y—Ar^1)_{\overline{m}}X$$

In the Formulas 2 and 3, X is independently an element selected from the halogen group;

$R^a$ to $R^d$ are independently hydrogen or —$SO_3R$, where R is hydrogen, alkyl having 1 to 20 carbon atoms, alkoxy having 1 to 20 carbon atoms, aryl having 6 to 18 carbon atoms, or acyl having 1 to 20 carbon atoms; and $Ar^1$, $Ar^2$, Y, n and m are as defined above.

The dihalide oligomer may be coupling-polymerized in an amount of 0.01 to 1 equivalent weight with respect to 1 equivalent weight of the dihalide monomer.

The coupling polymerization may be conducted in the presence of at least one solvent selected from the group consisting of dimethylacetamide, N-methylpyrrolidone, dimethylformamide, dimethyl sulfoxide, methylene chloride, chloroform, tetrahydrofuran, benzene, toluene, and xylene.

In one embodiment, $R^a$ to $R^d$ in the dihalide monomer represented by the Formula 2 may be all hydrogen.

In an embodiment where $R^a$ to $R^d$ in the dihalide monomer of the Formula 2 are all halogen, the preparation method may further comprise sulfonating the coupling-polymerized polymer to introduce at least one —$SO_3R$ group into the polymer, where R is hydrogen, alkyl having 1 to 20 carbon atoms, alkoxy having 1 to 20 carbon atoms, aryl having 6 to 18 carbon atoms, or acyl having 1 to 20 carbon atoms.

In another embodiment, R may be hydrogen. In this case, sulfonation of the polymer obtained by the coupling polymerization may be conducted in the presence of at least one sulfonic acid compound selected from the group consisting of concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP).

According to another embodiment, when $R^a$ to $R^d$ in the dihalide monomer of the Formula 2 are all hydrogen, the preparation method may further comprise sulfonating the dihalide monomer to introduce at least one —$SO_3R$ group into the polymer, where R is hydrogen, alkyl having 1 to 20 carbon atoms, alkoxy having 1 to 20 carbon atoms, aryl having 6 to 18 carbon atoms, or acyl having 1 to 20 carbon atoms.

In one embodiment, R may be alkyl having 1 to 20 carbon atoms, alkoxy having 1 to 20 carbon atoms, aryl having 6 to 18 carbon atoms, or acyl having 1 to 20 carbon atoms. In this case, the preparation method may further comprise eliminating R to introduce at least one —$SO_3H$ group before or after the coupling polymerization step. The removal of R to introduce at least one —$SO_3H$ group may be conducted in the presence of at least one compound selected from the group consisting of lithium bromide (LiBr), pyridine hydrochloride, sodium nitrate, and sodium nitrite.

Y is independently oxygen (O), sulfur (S), or a chemical bond; and n and m are a degree of polymerization for each repeating unit, where n is an integer from 10 to 99, and m is an integer from 1 to 100.

In one embodiment, $R^1$ to $R^4$ may be all hydrogen.

In another embodiment, at least one of $R^1$ to $R^4$ may be —$SO_3R$, the others being hydrogen, where R is alkyl having 1 to 20 carbon atoms, alkoxy having 1 to 20 carbon atoms, aryl having 6 to 18 carbon atoms, or acyl having 1 to 20 carbon atoms.

In another embodiment, at least one of $R^1$ to $R^4$ may be —$SO_3H$, the others being hydrogen.

In accordance with the present invention, there is also provided a method of preparing the polyarylene-based polymer that includes:

conducting a coupling polymerization using a dihalide monomer represented by the following Formula 2 and a dihalide oligomer represented by the following Formula 3 in the presence of a catalyst:

In accordance with another aspect of the present invention, there is also provided a polymer electrolyte membrane for a fuel cell including the polyarylene-based polymer.

In accordance with another aspect of the present invention, there is also provided a membrane-electrode assembly including the polymer electrolyte membrane.

The polyarylene-based polymer of the present invention, which is a polymer designed to have a long side chain of the hydrophilic moiety and dense sulfonic acid groups, may improve the formation of ion channels when fabricating a polymer membrane, and may also provide good chemical stability of the hydrophilic moiety and good dimensional stability against water due to the formation of the main polymer chain through direct carbon-carbon bonds. The preparation method of the present invention greatly simplifies the production of the polymer. Further, a polymer electrolyte membrane using the polymer exhibits good properties as a polymer electrolyte membrane for a fuel cell, such as, for example, high proton conductivity, even under an atmosphere with low water uptake, and good dimensional stability against a long-term exposure to water.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
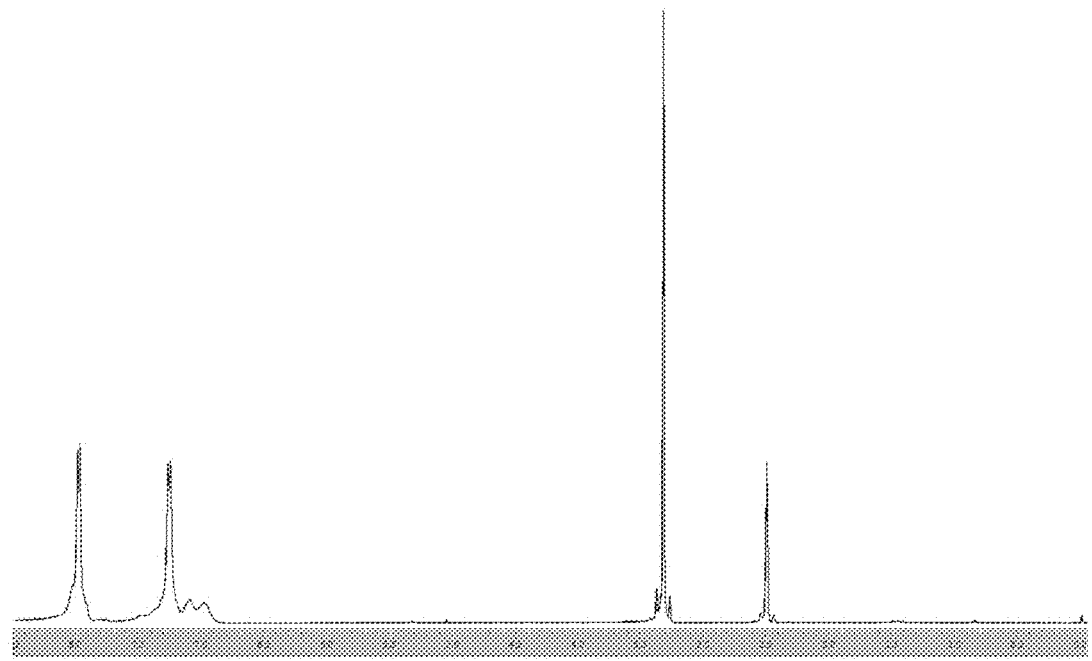
FIGS. 1 to 4 are graphs showing the nuclear magnetic resonance (NMR) spectra of the polyarylene-based polymers according to the examples of the present invention.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Hereinafter, a detailed description will be given as to a polyarylene-based polymer, a preparation method for the same, and a polymer electrolyte membrane for fuel cell using the polymer according to the preferred embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

If not stated otherwise in this specification, a part denoted by '*' in the chemical formulas refers to a portion bonded in the main chain of the polyarylene-based polymer.

If not stated otherwise, the term "sulfonation" as used herein is defined as a reaction (including a substitution reaction, addition reaction, or elimination reaction) for introducing a —$SO_3R$ group into a defined compound, where R is hydrogen, alkyl having 1 to 20 carbon atoms, alkoxy having 1 to 20 carbon atoms, aryl having 6 to 18 carbon atoms, or acyl having 1 to 20 carbon atoms.

The inventors of the present invention, through repeated studies of polymer electrolyte membranes for fuel cells, discovered that in the case when a polyarylene-based polymer is prepared from a dihalide monomer and a dihalide oligomer by coupling polymerization, and then endowed with sulfonic acid groups, the main chain of the polymer is formed through direct carbon-carbon bonds to enhance the chemical stability of the hydrophilic moiety. This method enables the preparation of a polymer designed to have a long side chain of the hydrophilic moiety with dense sulfonic acid groups, and provides an easy way to control the amount of the sulfonic acid groups introduced into the polymer by varying the equivalent weight of the sulfonating agent. The inventors of the present invention also discovered that the polymer electrolyte membrane prepared using the polymer exhibits high dimensional stability against long-term exposure to water, as well as high proton conductivity even in the atmosphere of a low water uptake.

In accordance with an embodiment of the present invention, there is provided a polyarylene-based polymer represented by the following Formula 1:

[Formula 1]

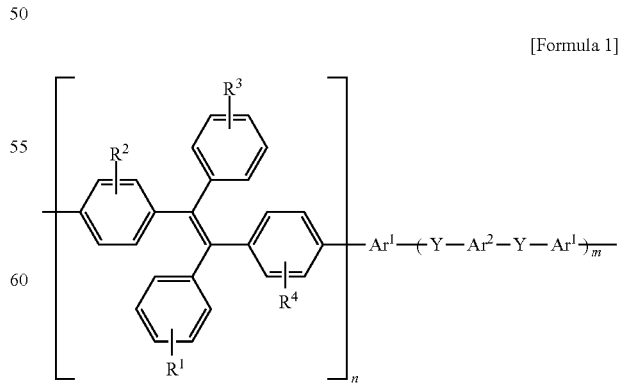

In Formula 1, $R^1$ to $R^4$ are independently hydrogen or —$SO_3R$, where R is hydrogen, alkyl having 1 to 20 carbon atoms, alkoxy having 1 to 20 carbon atoms, aryl having 6 to 18 carbon atoms, or acyl having 1 to 20 carbon atoms;

In one embodiment, $Ar^1$ is independently a substituent selected from the group consisting of the following Formula 5a,

[Formula 5a]

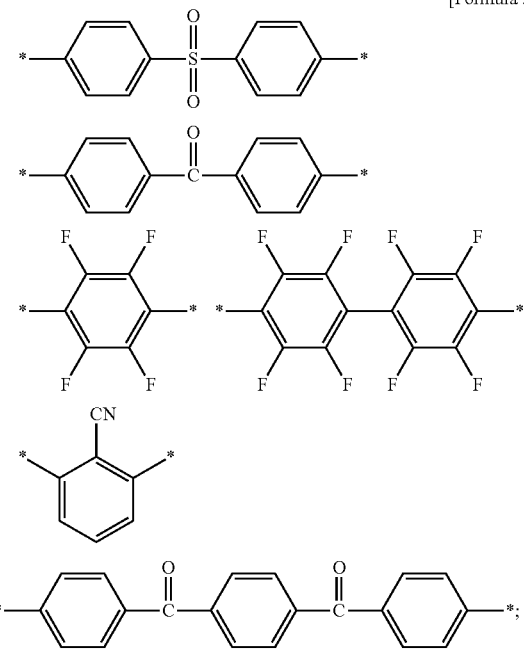

In another embodiment, $Ar^2$ is a substituent selected from the group consisting of the following Formula 6a,

[Formula 6a]

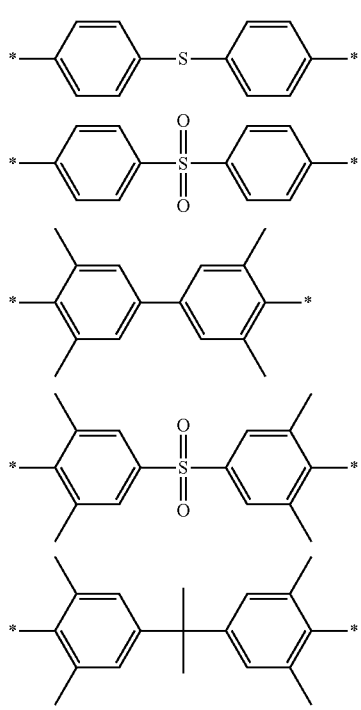

-continued

Y is independently oxygen (O), sulfur (S), or a chemical bond; and n and m are a degree of polymerization for each repeating unit, wherein n is an integer from 10 to 99, and m is an integer from 1 to 100.

Generally, the hydrophilic moiety in the main polymer chain is a portion for a transport of protons, and the hydrophobic moiety is a portion for supporting the properties of the membrane. The performance of the polymer membrane may depend on the structures of the hydrophilic and hydrophobic moieties.

As can be seen from Formula 1, the polyarylene-based polymer of the present invention is designed to have a long side chain of the hydrophilic moiety and dense arylene groups into which sulfonic acid groups can be introduced, thereby improving the formation of ion channels during fabrication of a polymer membrane, and creating high proton conductivity. Also, the hydrophobic moiety is relatively expanded to secure dimensional stability against water.

In particular, compared to the conventional polymers of which the main chain is formed through carbon-oxygen, carbon-sulfur, or carbon-nitrogen bonds, the polyarylene-based polymer according to an embodiment of the present invention, in which the main chain is formed through direct carbon-carbon bonds (as indicated by an arrow in Formula 1'), are superior in both chemical stability of the hydrophilic moiety and dimensional stability against water due to hydrophilic and hydrophobic moieties provided in the form of block copolymers.

[Formula 1']

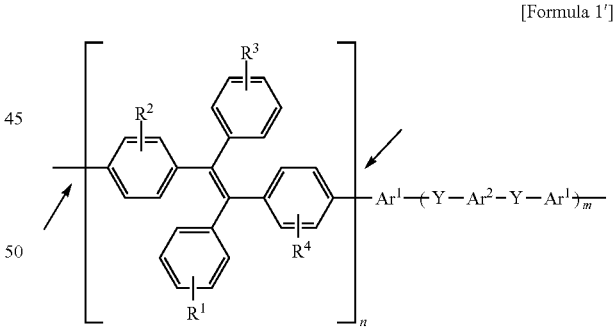

In one embodiment, the polyarylene-based polymer is represented by the Formula 1, where at least one of $R^1$ to $R^4$ is —$SO_3H$ and the others are hydrogen; preferably, at least two of $R^1$ to $R^4$ are —$SO_3H$ and the others are hydrogen; more preferably, each of $R^1$ to $R^4$ is —$SO_3H$. In other words, the polyarylene-based polymer is designed to have dense sulfonic acid groups, thereby improving the formation of ion channels and creating high proton conductivity.

The polyarylene-based polymer containing sulfonic acid groups (—$SO_3H$) may be prepared by sulfonating a precursor that is the polymer of the Formula 1 where each of $R^1$ to $R^4$ is hydrogen. The polyarylene-based polymer may also be prepared by sulfonating a precursor that is the polymer of the Formula 1 where at least one of $R^1$ to $R^4$ is —$SO_3R$ and the others are hydrogen; preferably, at least two of $R^1$ to $R^4$ are —$SO_3R$ and the others are hydrogen; preferably, at least three of $R^1$ to $R^4$ are —$SO_3R$ and the other is hydrogen; more preferably, each of $R^1$ to $R^4$ is —$SO_3R$, to convert —$SO_3R$ of the precursor to a sulfonic acid group (—$SO_3H$), where R is as defined above. The preparation methods for the polyarylene-based polymer and its precursors are described below.

In Formula 1, $Ar^1$ may be independently a substituent selected from the group consisting of the following Formula 5a, and $Ar^2$ may be a substituent selected from the group consisting of the following Formula 6a,

[Formula 5a]

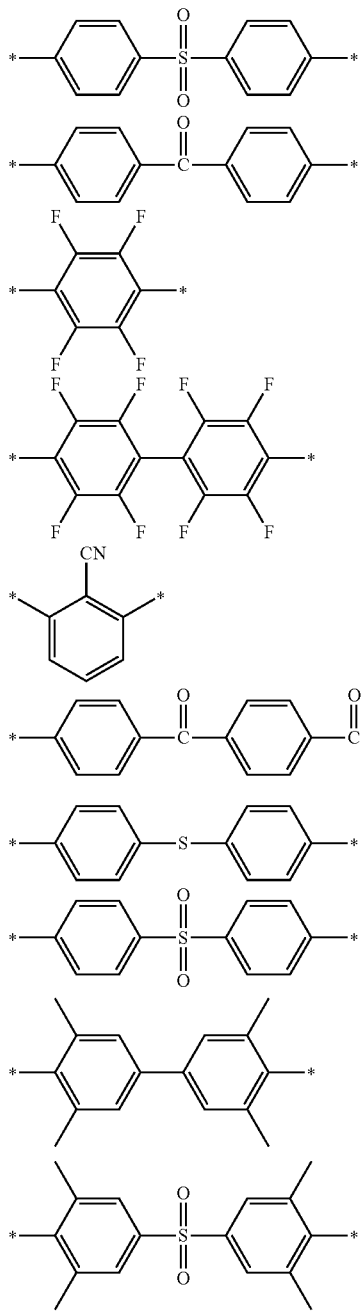

[Formula 6a]

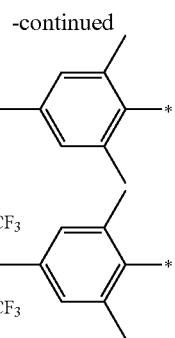

In the Formula 1, Y is independently oxygen (O), sulfur (S), or a chemical bond, preferably oxygen (O).

In the Formula 1, n is a degree of polymerization of the hydrophilic moiety, and m is a degree of polymerization of the hydrophobic moiety, where n is an integer of 10 to 99, preferably 10 to 50, more preferably 20 to 50; and m is an integer of 1 to 100, preferably 10 to 60, more preferably 20 to 50.

The polyarylene-based polymer may have an average molecular weight of 10,000 to 1,000,000, preferably 50,000 to 1,000,000, more preferably 50,000 to 500,000. The weight average molecular weight of the polyarylene-based polymer is preferably controlled within the above range in order to secure minimum mechanical properties applicable to polymer electrolyte membranes and a minimum processability required in the fabrication of electrolyte membranes. It is further contemplated that the average molecular weight may range from 10,000 to 100,000, 200,000, 300,000, 400,000, 500,000, 600,000, 700,000, 800,000, or 900,000. Is also contemplated within the scope of the invention that the average molecular weight may range from 1,000,000 to 900,000, 800,000, 700,000, 600,000, 500,000, 400,000, 300,000, 200, 000, 100,000, or 10,000.

In accordance with another embodiment of the present invention, there is provided a method for preparing the polyarylene-based polymer of the Formula 1 that includes: conducting a coupling polymerization using a dihalide monomer represented by the following Formula 2 and a dihalide oligomer represented by the following Formula 3 in the presence of a catalyst:

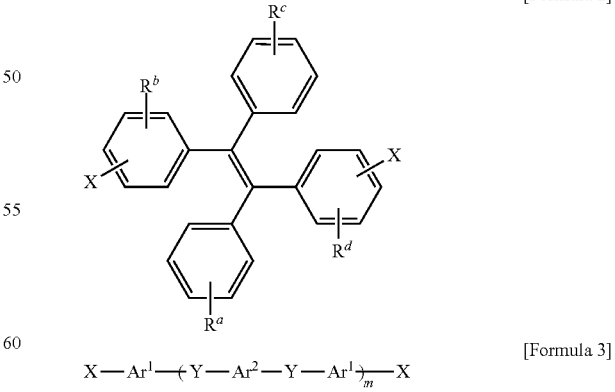

In the Formulas 2 and 3, X is independently an element selected from the halogen group;

$R^a$ to $R^d$ are independently hydrogen or —$SO_3R$, where R is hydrogen, alkyl having 1 to 20 carbon atoms, alkoxy having 1 to 20 carbon atoms, aryl having 6 to 18 carbon atoms, or acyl having 1 to 20 carbon atoms; and $Ar^1$, $Ar^2$, Y, n and m are as defined above.

The coupling polymerization reaction is divided into an activation step and a polymerization step, which are conducted under conditions known to those skilled in the art and may not be specifically limited in the present invention.

According to the present invention, a dihalide monomer of Formula 2 and a dihalide oligomer of the Formula 3 at a defined equivalent weight ratio participate in the coupling polymerization reaction. Here, the dihalide oligomer is used in the coupling polymerization reaction, based on 1 equivalent of the dihalide monomer, in an amount of 0.01 to 1 equivalent weight, preferably 0.05 to 0.8 equivalent weight, more preferably 0.1 to 0.5 equivalent weight. Desirably, the equivalent weight ratio of the dihalide oligomer to the dihalide monomer is controlled within the above range to secure the degree of polymerization and the properties of the polyarylene-based polymer. It is further contemplated that dihalide oligomer used in the coupling polymerization reaction may be based on 1 equivalent of the dihalide monomer in an amount that may range from 0.01 to 0.1, 0.2, 0.3, 0.4, 0.5, 0.6, 0.7, 0.8, 0.9, or 1.0 equivalent weight.

The dihalide monomer of the Formula 2 and the dihalide oligomer of the Formula 3 may be separately prepared or commercially available.

According to an example of the present invention, the dihalide oligomer of the Formula 3 may be prepared by conducting a reaction between at least one monomer selected from the group consisting of the Formula 5b and at least one monomer selected from the group consisting of the Formula 6b:

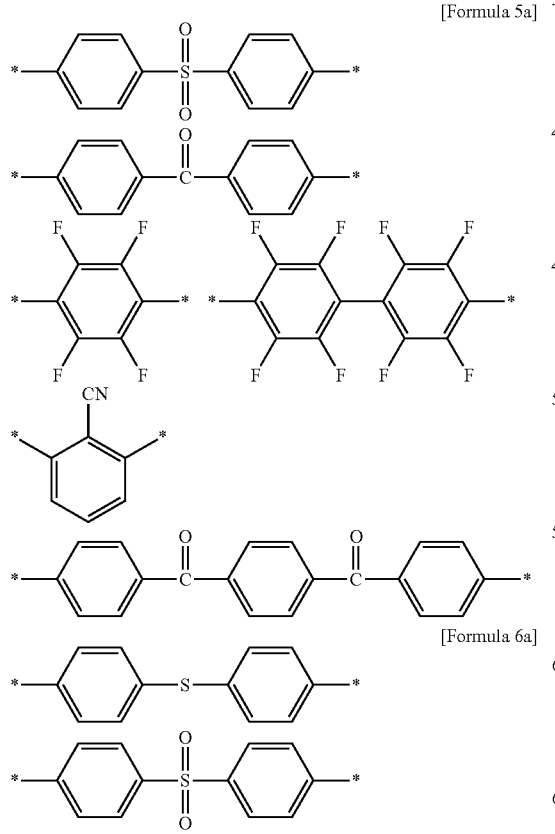

[Formula 5a]

[Formula 6a]

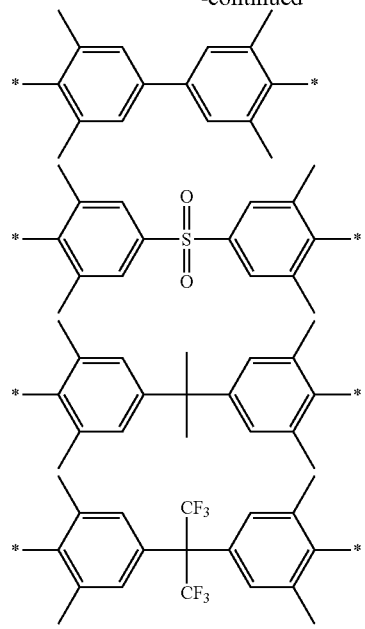

In the Formula 5b, X is independently an element selected from the halogen group.

The above-described preparation method is an example of the preparation method for a dihalide oligomer of the Formula 3, where Y is oxygen (O). The dihalide oligomer of the Formula 3 where Y is sulfur (S) or a chemical bond may also be prepared by those skilled in the art with reference to the above-described preparation method, which is not intended to limit the present invention.

The coupling polymerization reaction may be conducted in the presence of an organic solvent, preferably at least one solvent selected from the group consisting of dimethylacetamide, N-methylpyrrolidone, dimethylformamide, dimethyl sulfoxide, methylene chloride, chloroform, tetrahydrofuran, benzene, toluene, and xylene.

According to the present invention, the coupling polymerization reaction may involve activating a mixture of the monomer and the oligomer at 50° C. to 180° C. for 2 to 4 hours, conducting a polymerization at 25° C. to 150° C. for 2 to 24 hours, causing precipitation, and subjecting the precipitate to washing and drying.

According to another embodiment of the present invention, $R^a$ to $R^d$ of the dihalide monomer in the Formula 2 may be all hydrogen, as shown in the following Formula 2', where X is as defined in the Formula 2.

[Formula 2']

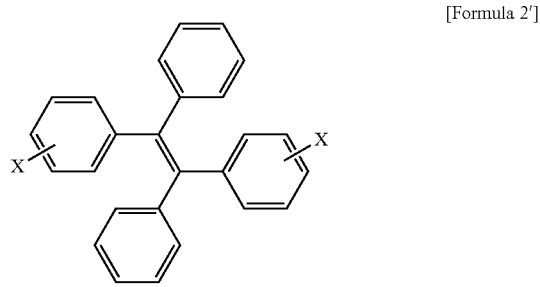

Hence, the embodiment may be achieved as a method of conducting a coupling polymerization reaction of a dihalide monomer of the Formula 2' and a dihalide oligomer of the Formula 3 to prepare a polyarylene-based polymer of the following Formula 4, where $Ar^1$, $Ar^2$, Y, n and m are as defined above.

[Formula 4]

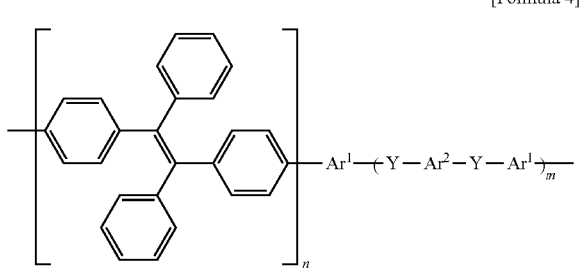

According to further another embodiment of the present invention, the preparation method may further comprise sulfonating the polymer of the Formula 4 to introduce at least one —$SO_3R$ group into the polymer (where R is hydrogen, alkyl having 1 to 20 carbon atoms, alkoxy having 1 to 20 carbon atoms, aryl having 6 to 18 carbon atoms, or acyl having 1 to 20 carbon atoms).

In particular, according to the present invention, the R in the sulfonation step may be hydrogen. In other words, the sulfonation of the polymer may be a step of introducing at least one sulfonic acid group (—$SO_3H$) into the polymer.

Here, the step of introducing a sulfonic acid group (—$SO_3H$) into the polymer may be conducted by a general method of activating the polymer to react with a sulfonic acid compound. The sulfonic acid compound may be at least one compound selected from the group consisting of concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP).

The step of introducing at least one sulfonic acid group (—$SO_3H$) into the polymer may also be conducted by dissolving the polymer directly in the sulfonic acid compound, or dissolving the polymer in an organic solvent and then adding the sulfonic acid compound to cause a reaction at 0° C. to 100° C. (preferably 25° C. to 70° C.) for 1 to 24 hours, and subjecting the product to filtration and drying.

According to further another embodiment of the present invention, the preparation method may further comprise sulfonating the dihalide monomer of the Formula 2' to introduce at least one —$SO_3R$ group into the dihalide monomer (where R is hydrogen, alkyl having 1 to 20 carbon atoms, alkoxy having 1 to 20 carbon atoms, aryl having 6 to 18 carbon atoms, or acyl having 1 to 20 carbon atoms).

In particular, according to the present invention, the R in the sulfonation step may be alkyl having 1 to 20 carbon atoms, alkoxy having 1 to 20 carbon atoms, aryl having 6 to 18 carbon atoms, or acyl having 1 to 20 carbon atoms, other than hydrogen.

According to the present invention, when R is not hydrogen (i.e., R is alkyl having 1 to 20 carbon atoms, alkoxy having 1 to 20 carbon atoms, aryl having 6 to 18 carbon atoms, or acyl having 1 to 20 carbon atoms), prior to the coupling polymerization step, R is removed from the dihalide monomer including at least one —$SO_3R$ group to introduce at least one —$SO_3H$ group into the dihalide monomer, and a coupling polymerization step is conducted using the dihalide monomer; or a coupling polymerization step is conducted using the dihalide monomer including at least one —$SO_3R$, and R is removed from the polymer product to introduce at least one —$SO_3H$ group into the polymer.

In consideration of the efficiency of the sulfonation reaction for the monomer or the polymer, it is preferable to conduct a coupling polymerization step using the halide monomer including at least one —$SO_3R$ group and then remove R from the polymer product, thereby introducing at least one sulfonic acid group (—$SO_3H$) into the polymer.

Removal of R from the monomer or the polymer to introduce at least one sulfonic acid group (—$SO_3H$) may be conducted by a general method using a removing agent (alkyl remover, etc.) that is capable of removing R from the —$SO_3R$ group of the monomer or the polymer. Here, the remover may be at least one compound selected from the group consisting of lithium bromide (LiBr), pyridine hydrochloride, sodium nitrate, and sodium nitrite. The step may also be conducted by dissolving the polymer in an organic solvent, adding the removing agent, causing a reaction at 0° C. to 100° C. (preferably 25° C. to 70° C.) for 1 to 24 hours (preferably 1 to 20 hours), and then subjecting the product to filtration and drying.

The above-described embodiments may be applied to prepare a polyarylene-based polymer of the Formula 1, where $R^1$ to $R^4$ are all hydrogen; at least one of $R^1$ to $R^4$ is —$SO_3R$, and the others are hydrogen (where R is alkyl having 1 to 20 carbon atoms, alkoxy having 1 to 20 carbon atoms, aryl having 6 to 18 carbon atoms, or acyl having 1 to 20 carbon atoms); or at least one of $R^1$ to $R^4$ is —$SO_3H$, and the others are hydrogen.

In accordance with a still another embodiment of the present invention, there is provided a polymer electrolyte membrane for fuel cell comprising the polyarylene-based polymer having a sulfonic acid group (—$SO_3H$) (that is, the polyarylene-based polymer of the Formula 1), where at least one of $R^1$ to $R^4$ is —$SO_3H$, and the others are hydrogen.

The polymer electrolyte membrane may be fabricated by a general method known to those skilled in the art, except that it comprises the polyarylene-based polymer having a sulfonic acid group according to the present invention.

In other words, the polymer electrolyte membrane may be prepared by dissolving the polyarylene-based polymer having a sulfonic acid group in an organic solvent such as dimethylacetamide, dimethylacrylic acid (DMAc), N-methyl-2-pyrrolidone (NMP), dimethylformamide (DMF), etc., casting the solution on a glass plate, and then drying the glass plate at 80° C. to 160° C.

In addition to the polyarylene-based polymer having a sulfonic acid group, any constituent components generally used in preparation of a polymer electrolyte membrane may be further included in the polymer electrolyte membrane.

For example, the polymer electrolyte membrane may further comprise a proton-conducting polymer, which is at least one polymer selected from the group consisting of polyimide, polyether ketone, polysulfone, polyether sulfone, polyether ether sulfone, polybenzimidazole, polyphenylene oxide, polyphenylene sulfide, polystyrene, polytrifluorostyrene sulfonic acid, polystyrene sulfonic acid, polyurethane, and branched sulfonated polysulfone ketone copolymer.

The polymer electrolyte membrane may also further comprise at least one inorganic substance selected from the group consisting of silicon dioxide ($SiO_2$), titanium dioxide ($TiO_2$), inorganic phosphate, sulfonated silicon dioxide (sulfonated SiO$_2$), sulfonated zirconium oxide (sulfonated ZrO), and sulfonated zirconium phosphate (sulfonated ZrP).

The polymer electrolyte membrane of the present invention may be used for a membrane-electrode assembly comprising an anode, a cathode, and an electrolyte membrane sandwiched between the two electrodes. The anode and the cathode are known to those skilled in the art and are not be specifically limited.

The polymer electrolyte membrane, since it is prepared using the polyarylene-based polymer having a sulfonic acid group according to the present invention, exhibits excellent properties in mechanical stability, thermal stability, chemical stability, and processability. Additionally, the polyarylene-based polymer displays excellent properties as a polymer electrolyte membranes, such as high proton conductivity and high dimensional stability, with little change in the characteristics of the electrolyte membrane even under long-term exposure to water, thereby providing increased efficiency and performance in the field of battery chemistry, such as fuel cells, secondary cells, etc.

Hereinafter, for better understandings of the present invention, a description will be given as to the preferred examples as follows, which are set forth to illustrate the present invention and should not be construed to limit the present invention.

Preparation Example 1

Synthesis of Dihalide Monomer

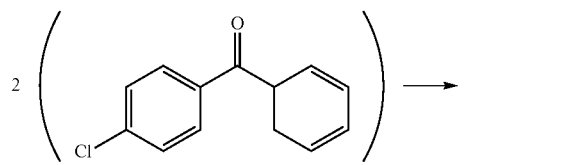

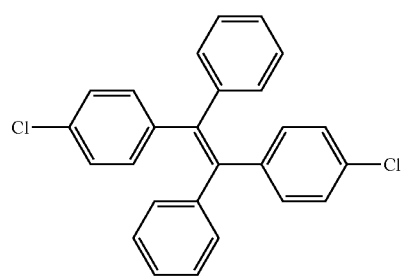

Under a nitrogen atmosphere, about 200 mL of dimethoxyethane was put in a three-necked round bottom flask equipped with a condenser, a magnetic bar, a bubbler, and a solid addition tube. After addition of titanium tetrachloride (about 10 g), about 4 g of LiAlH$_4$ was slowly added through the solid addition tube. The reactant solution was heated under reflux for about 3 hours and then cooled down to the room temperature. Using a glass syringe, a solution of 4-benzophenone chloride (about 5.44 g) in dimethoxyethane (50 mL) was added.

Subsequently, the reactant solution was heated under reflux for about 12 hours and cooled down to the room temperature. The reaction was terminated with pure water, and the organic phase was washed with 1M HCl solution. Diethylether was used to extract byproducts, and the solvent was eliminated. Recrystallization using ethylacetic acid and methanol was conducted to obtain the final product, (E)-1,2-bis(4-chlorophenyl)-1,2-diphenylethene (80% yield).

Preparation Example 2

Synthesis of Dihalide Monomer with Alkyl Sulfonyl Substituent

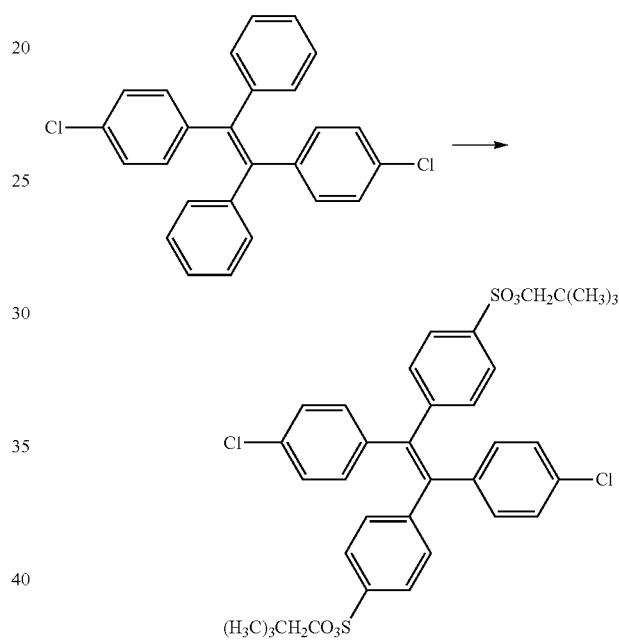

Under the nitrogen atmosphere, about 5 g of the product of Preparation Example 1 was dissolved in about 100 mL of methylene chloride in a three-necked round bottom flask equipped with a condenser, a magnetic bar, a bubbler, and a dropping funnel. To the flask was slowly added a solution containing about 7.3 g of chlorosulfonic acid dissolved in about 50 mL of methylene chloride through the dropping funnel, and the flask was subjected to agitation for about 12 hours.

After neutralization of the reactant solution, about 8.8 g of thionyl chloride was added to the solution, which was then stirred for about one hour and, after addition of neopentanol (about 6.5 mL), heated under reflux for about 12 hours. The reactant solution was cooled down to the room temperature, and pure water was used to terminate the reaction and wash the organic phase. Subsequently, ethyl acetate was added to extract the byproducts, and the solvent was eliminated. Then, recrystallization was conduced with ethyl acetate and methanol to obtain the final product, (E)-neopentyl 4,4'-(1,2-bis(4-chlorophenyl)ethane-1,2-diyl)dibenzenesulfonate (about 50% yield).

Preparation Example 3

Synthesis of Dihalide Oligomer

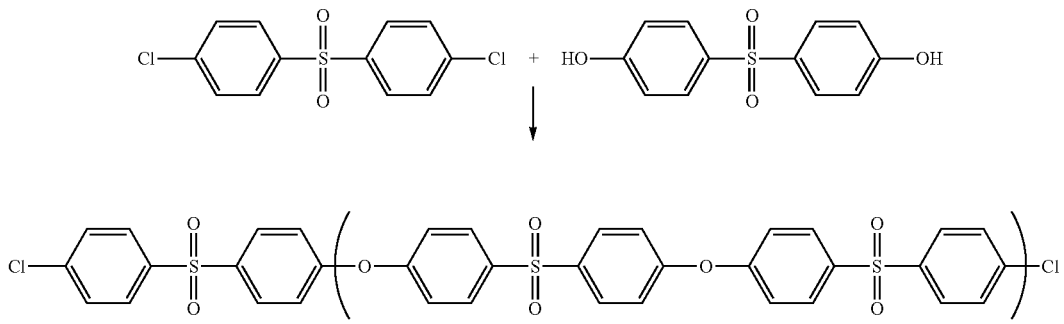

A four-necked round bottom flask equipped with an impeller, a bubbler, a dean stark, and a condenser was purged with nitrogen. To the flask were added about 131.1 g of 4,4'-dichlorophenylsulfone, 100 g of 4,4'-dihydroxyphenylsulfone, and about 82.7 g of potassium carbonate, followed by about 450 mL of N-methylpyrrolidone and about 100 mL of toluene.

Subsequently, the reactant solution was heated to about 140° C., heated under reflux for about 4 hours to eliminate water, and then more heated to about 190° C. to cause a reaction for about 12 hours. After filtration of the reactant solution, a mixed solution of ethanol and pure water (ethanol:pure water=8:2) was used to form a precipitate. The precipitate thus obtained was washed with the mixed solution several times, and dried out in an oven at about 120° C. for 24 hours to obtain the final product of the above Formula (about 70% yield).

Example 1

Synthesis of Polyarylene-Based Polymer

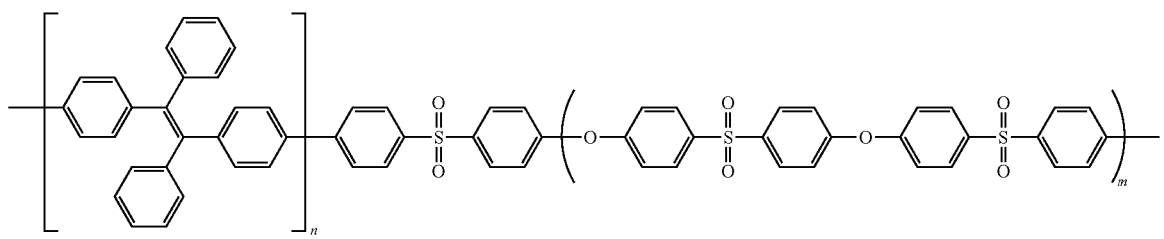

Each of two three-necked round bottom flasks was equipped with a condenser, a magnetic bar, a vacuum stopper, and a rubber stopper. To the first flask were added about 3.6 g of anhydrous nickel chloride and about 5.4 g of bipyridine. To the second flask were added about 4.3 g of the final product of Preparation Example 1, about 10 g of the final product of Preparation Example 3 (corresponding to about 0.05 equivalent weight of the final product of Preparation Example 3 based on 1 equivalent weight of the final product of Example 1), and about 2.7 g of zinc.

Subsequently, the context of the second flask was dried under vacuum for about 2 hours with a vacuum pump, and about 140 mL of N-methylpyrrolidone was added using a cannula. The reactant solution was heated to about 80° C. and stirred for about 3 hours. Then, the solution of the first flask was added into the second flask via a cannula, and the resultant solution was stirred for about 4 hours.

The reactant solution was subjected to filtration, and pure water was added to form a precipitate. The precipitate thus obtained was washed with nitric acid solution and hydrochloric acid solution several times, and dried out in an oven at about 120° C. for 24 hours to obtain a polyarylene-based polymer of the above formula (yield: about 80%; n in the formula: about 20; and weight average molecular weight: about 103,000)

The polymer was subjected to $^1$H-NMR to analyze the structure, and the results of the analysis are presented in FIG. 1.

Example 2

Synthesis of Polyarylene-Based Polymer

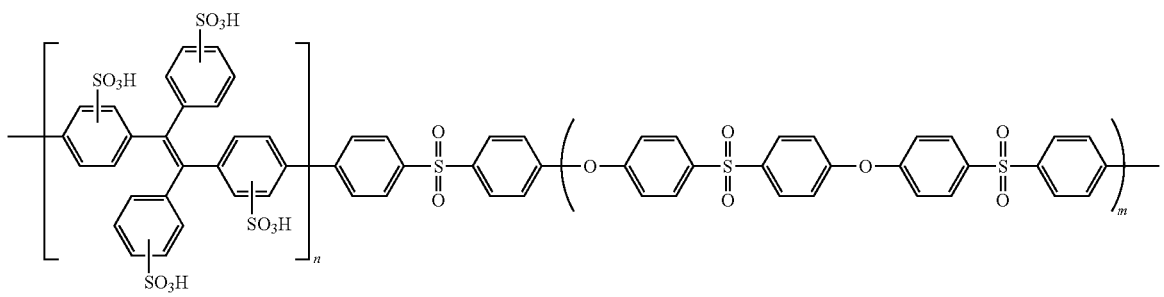

50 g of the polymer obtained in Example 1 was dissolved in 700 mL of concentrated sulfuric acid, and the resultant solution was heated to about 50° C. to cause a reaction for about 12 hours.

Subsequently, pure water was added to the reactant solution to form a precipitate, which was washed with pure water at about 60° C. several times to remove sulfuric acid. The washed-out precipitate was dried in an oven at about 120° C. for 24 hours to obtain a polyarylene-based polymer of the above formula (yield: about 90%; n in the formula: about 20; and weight average molecular weight: about 118,000).

Figure 2:
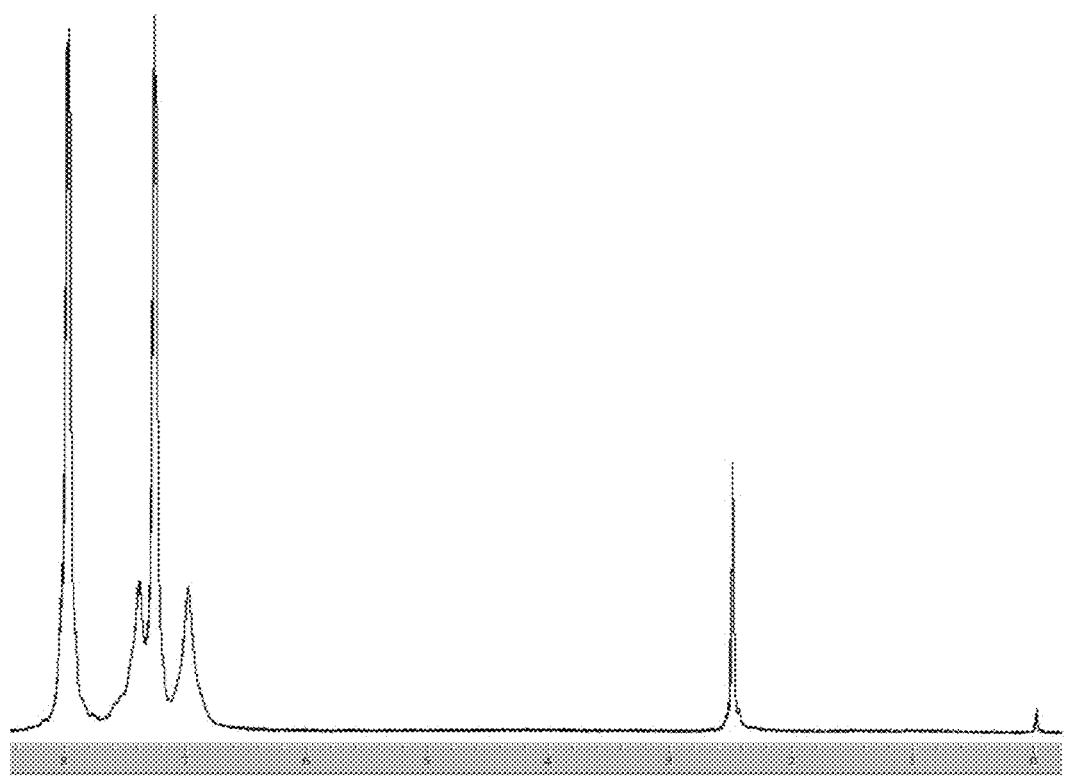

The polymer was subjected to $^1$H-NMR to analyze the structure, and the results of the analysis are presented in FIG. 2. The introduction of a sulfonic acid group into the polymer of Example 1 caused a peak at about 7.4 ppm, resulting from the downfield shift of the hydrogen at the alpha-position of the sulfonic acid group. The peak area ratio showed the complete synthesis of the target product.

Example 3

Synthesis of Polyarylene-Based Polymer

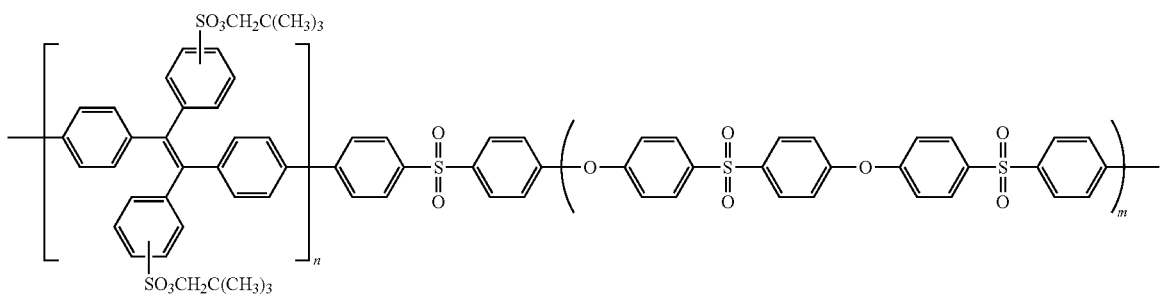

Each of two three-necked round bottom flasks was equipped with a condenser, a magnetic bar, a vacuum stopper, and a rubber stopper. To the first flask were added about 7.2 g of anhydrous nickel chloride and about 10.9 g of bipyridine. To the second flask were added about 15.2 g of the final product of Preparation Example 2, about 10 g of the final product of Preparation Example 3 (corresponding to about 0.025 equivalent weight of the final product of Preparation Example 3 based on 1 equivalent weight of the final product of Example 2), and about 5.5 g of zinc.

Subsequently, the context of the second flask was dried under vacuum for about 2 hours with a vacuum pump, and about 250 mL of N-methylpyrrolidone was added using a cannula. The reactant solution was heated to about 80° C. and stirred for about 3 hours. Then, the solution of the first flask was added into the second flask via a cannula, and the resultant solution was stirred for about 4 hours.

The reactant solution was subjected to filtration, and pure water was added to form a precipitate. The precipitate thus obtained was washed with nitric acid solution and hydrochloric acid solution several times, and dried out in an oven at about 120° C. for 24 hours to obtain a polyarylene-based polymer of the above formula (yield: about 80%; n in the formula: about 40; and weight average molecular weight: about 143,000)

Figure 3:
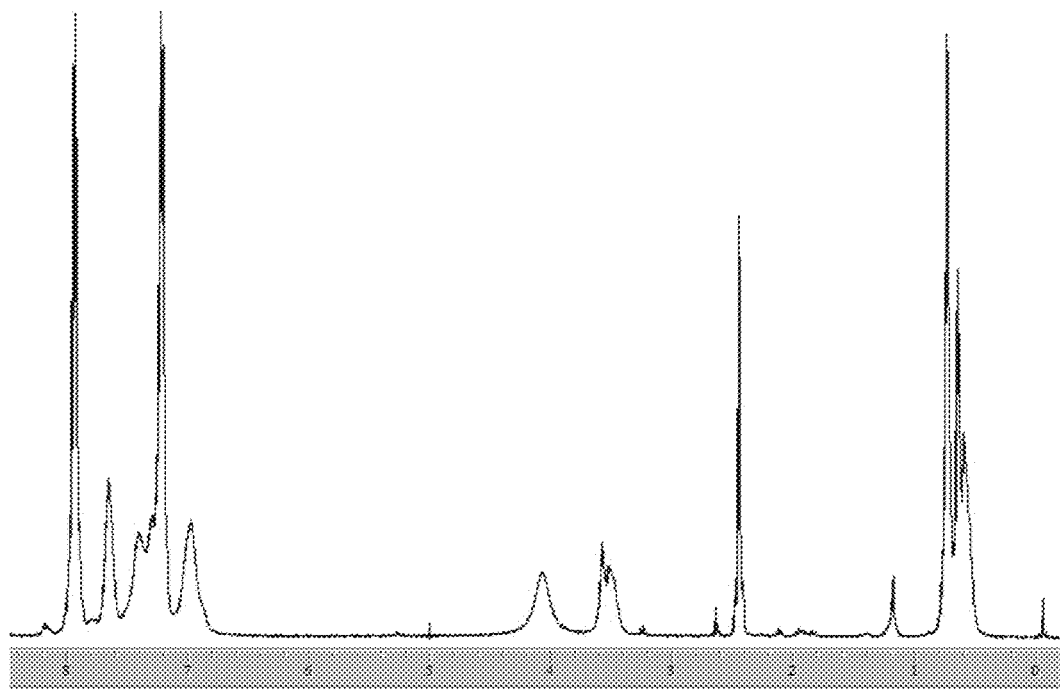

The polymer was subjected to $^1$H-NMR to analyze the structure, and the results of the analysis are presented in FIG. 3.

Example 4

Synthesis of Polyarylene-Based Polymer

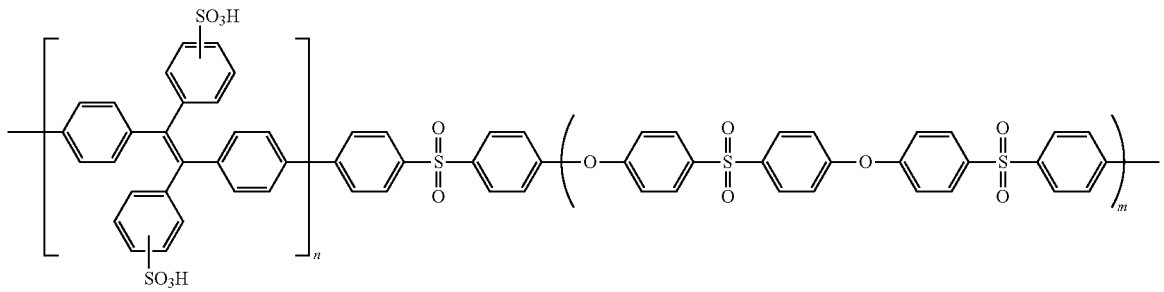

50 g of the polymer obtained in Example 3 was dissolved in N-methylpyrrolidone and, after addition of lithium bromide (LiBr) (about 7.6 g), the resultant solution was heated to about 80° C. to cause a reaction for about 12 hours.

Subsequently, pure water was added to the reactant solution to form a precipitate, which was then washed with pure water at about 60° C. several times to remove sulfuric acid. The washed-out precipitate was dried in an oven at about 120° C. for 24 hours to obtain a polyarylene-based polymer of the above formula (yield: about 90%; n in the formula: about 40; and weight average molecular weight: about 114,000).

Figure 4:
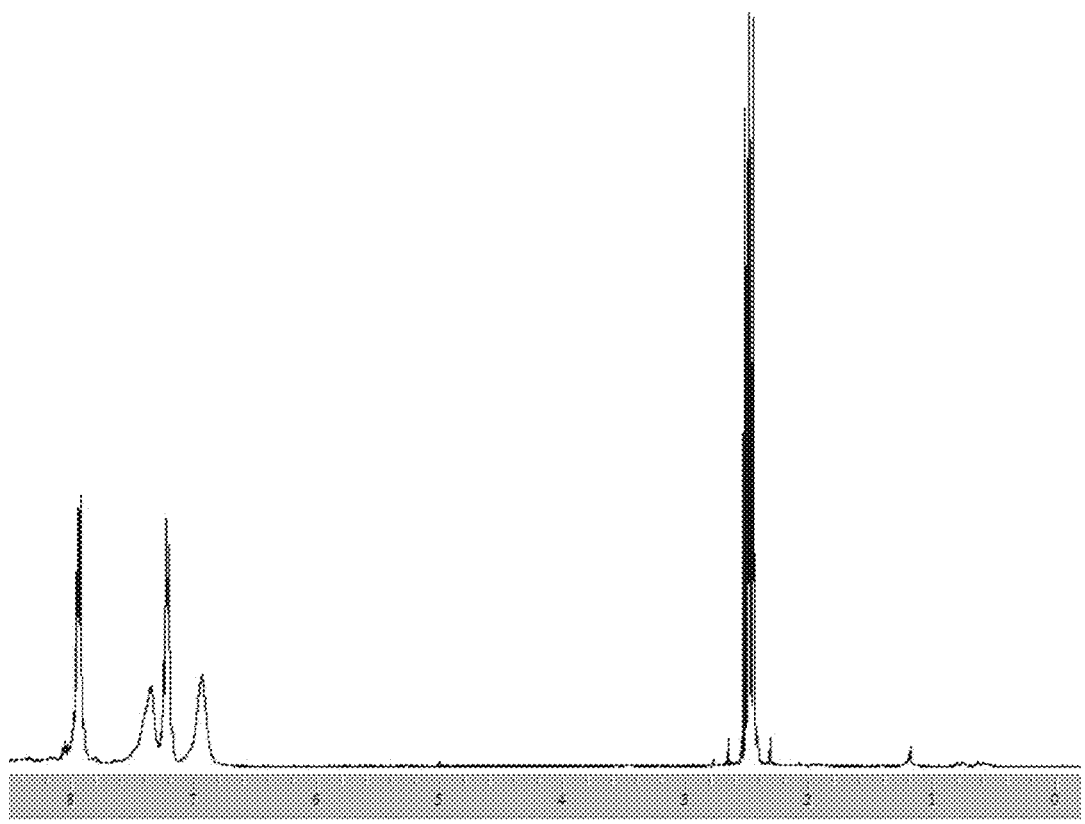

The polymer was subjected to $^1$H-NMR to analyze the structure, and the results of the analysis are presented in FIG. 4. The removal of the alkyl group from the alkyl sulfonic acid group in the polymer of Example 3 converted the alkyl sulfonic acid group to a sulfonic acid group. This caused an up-field shift of the peak for the alkyl sulfonic acid at about 7.6 ppm to form a peak at about 7.4 ppm. Disappearance of peaks at about 3.6 ppm and about 0.8 to 0.4 ppm implied that no neopentyl group exists any more. The peak area ratio showed the complete synthesis of the target product.

Example 5

Preparation of Polymer Electrolyte Membrane

The polyarylene-based polymer of Example 2 was dissolved in dimethylacetamide. The solution was cast on a glass plate and dried at 120° C. to form a polymer electrolyte membrane.

Example 6

Preparation of Polymer Electrolyte Membrane

The polyarylene-based polymer of Example 4 was dissolved in dimethylacetamide. The solution was cast on a glass plate and dried at 120° C. to form a polymer electrolyte membrane.

Comparative Example

There was provided a commercially available cation exchange polymer electrolyte membrane (Nafion-211 manufactured by DuPont).

Experimental Example

Measurement of Molecular Weight and Polydispersity Index of Polymer

The polyarylene-based polymers of Examples 2 and 4 were measured in regard to weight average molecular weight (Mw) and polydispersity index (PDI=Mw/Mn) using chromatography. The measurement results are presented in Table 1.

The instrument and conditions for the measurement of the properties are given as follows:
GPC system: Waters 2414, supplied by Waters
Column: HR 3/4/5 column, supplied by Waters
Temperature: 80° C.
Elution solvent: Dimethylformamide
Elution rate: 1 mL/min
Reference substance: Polymethylmethacrylate (PMMA)

Measurement of Proton Conductivity of Polymer Electrolyte Membrane

The polymer electrolyte membranes of Examples 5 and 6 and Comparative Example were measured in regard to proton conductivity using an impedance spectrometer supplied by Solartron Analytical. The measurement results are presented in Table 1.

The impedance measurement was performed in the frequency range of 1 Hz to 1 MHz using in-plane impedance spectroscopy. In all the tests, the samples were impregnated with water.

Measurement of Methanol Permeability of Polymer Electrolyte Membrane

Each of the polymer electrolyte membranes of Examples 5 and 6 and Comparative Example was placed between two cell compartments. The one compartment was filled with 15 mL of aqueous 1M methanol solution, and the other was filled with 15 mL of distilled water. A volume of 1 μL of the distilled water in the first compartment was withdrawn at ten-minute intervals, and the compartment was then refilled with 10 μL of distilled water each time. The withdrawn sample was injected into a gas chromatograph to measure the methanol concentration. The methanol concentration was plotted as a function of time in a graph, and the methanol permeability was calculated from the slope of the graph according to the following equation. The measurement results are presented in Table 1.

$$P = (S \times V \times L)/(A \times C) \quad \text{[Equation]}$$

in which P is methanol permeability [cm$^2$/sec]; S is the slope [ppm/s]; V is the volume (cm$^3$) of the solution; L is the thickness (cm) of the electrolyte membrane; A is the area (cm$^2$) of the electrolyte membrane; and C is the methanol concentration (ppm).

TABLE 1

| | Polymer | | | Polymer Electrolyte Membrane | |
|---|---|---|---|---|---|
| Div. | Type | Weight Average Molecular Weight ($\times 10^3$) | Poly-dispersity | Proton Conductivity ($\times 10^{-3}$ S/cm) | Methanol Permeability ($\times 10^{-6}$ cm$^2$/sec) |
| Example 5 | Example 2 | 118 | 1.77 | 4.4 | 0.43 |
| Example 6 | Example 4 | 114 | 1.89 | 4.2 | 0.65 |
| Comparative Example | — | — | — | 3.5 | 2.1 |

As can be seen from the experimental results in Table 1, the polymer electrolyte membranes according to Examples 5 and 6, which are prepared respectively using the polyarylene-based polymer of Examples 2 an 4, showed good proton conductivity equivalent to or higher than that of the commercially available polymer electrolyte membrane of Comparative Example, and low methanol permeability, thereby providing excellent performances as polymer electrolytes membrane for fuel cell.

What is claimed is:

1. A polymer represented by the following Formula 1:

[Formula 1]

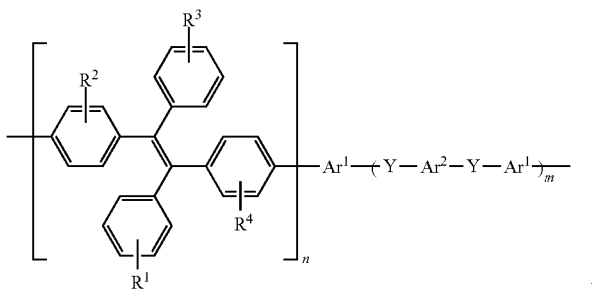

wherein $R^1$ to $R^4$ are independently hydrogen or —SO$_3$R, wherein R is hydrogen, alkyl having 1 to 20 carbon atoms, alkoxy having 1 to 20 carbon atoms, aryl having 6 to 18 carbon atoms, or acyl having 1 to 20 carbon atoms;

Ar$^1$ is independently a substituent selected from the group consisting of the following Formula 5a,

[Formula 5a]

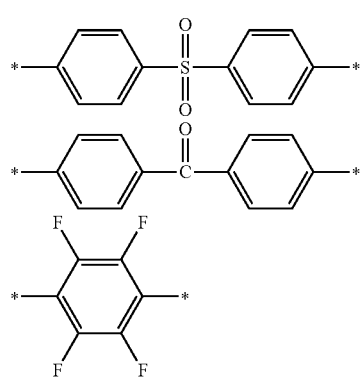

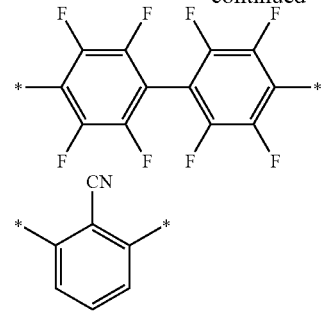

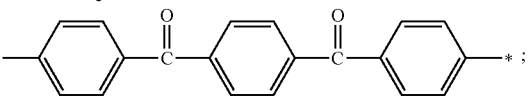

Ar$^2$ is a substituent selected from the group consisting of the following Formula 6a,

[Formula 6a]

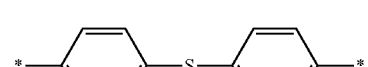

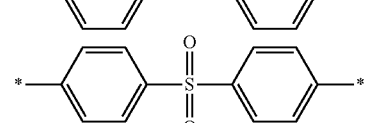

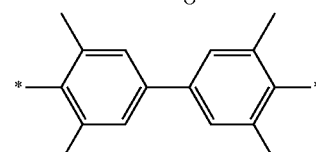

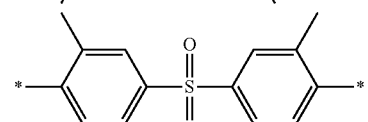

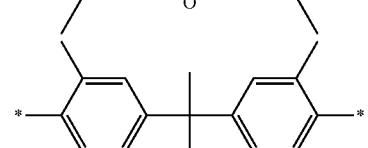

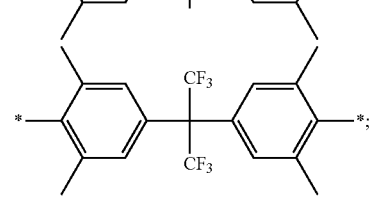

Y is independently oxygen (O), sulfur (S), or a chemical bond; and n and m are a degree of polymerization for each repeating unit, wherein n is an integer from 10 to 99, and m is an integer from 1 to 100.

2. The polymer of claim 1, wherein $R^1$ to $R^4$ are all hydrogen.

3. The polymer of claim 1, wherein at least one of $R^1$ to $R^4$ is —SO$_3$R, and the others are hydrogen, wherein R is alkyl having 1 to 20 carbon atoms, alkoxy having 1 to 20 carbon atoms, aryl having 6 to 18 carbon atoms, or acyl having 1 to 20 carbon atoms.

4. The polymer of claim 1, wherein at least one of $R^1$ to $R^4$ is —SO$_3$H, and the others are hydrogen.

5. The polymer of claim 1, wherein the polyarylene-based polymer has an average molecular weight of 10,000 to 1,000,000.

6. The polymer of claim 2, wherein the polyarylene-based polymer has an average molecular weight of 10,000 to 1,000,000.

7. The polymer of claim 3, wherein the polyarylene-based polymer has an average molecular weight of 10,000 to 1,000,000.

8. The polymer of claim 4, wherein the polyarylene-based polymer has an average molecular weight of 10,000 to 1,000,000.

9. A method for preparing polymer of claim 1, comprising:
   conducting a coupling polymerization using a dihalide monomer represented by the following Formula 2 and a dihalide oligomer represented by the following Formula 3 in the presence of a catalyst:

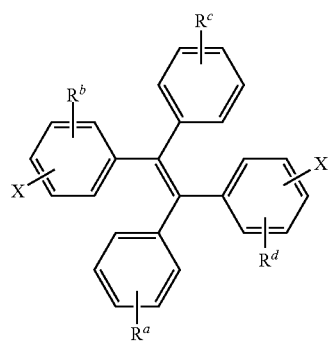

[Formula 2]

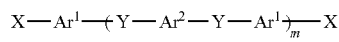

[Formula 3]

wherein X is independently an element selected from the halogen group;

$R^a$ to $R^d$ are independently hydrogen or —SO$_3$R, wherein R is hydrogen, alkyl having 1 to 20 carbon atoms, alkoxy having 1 to 20 carbon atoms, aryl having 6 to 18 carbon atoms, or acyl having 1 to 20 carbon atoms;

Ar$^1$ is independently a substituent selected from the group consisting of the following Formula 5a,

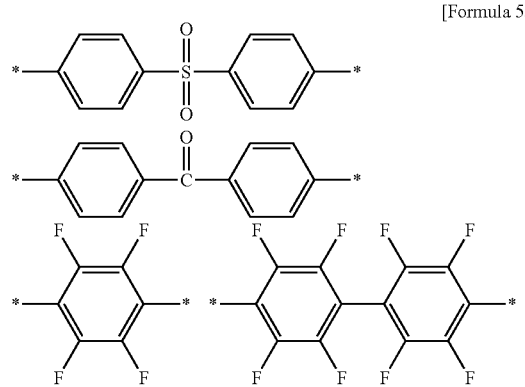

[Formula 5a]

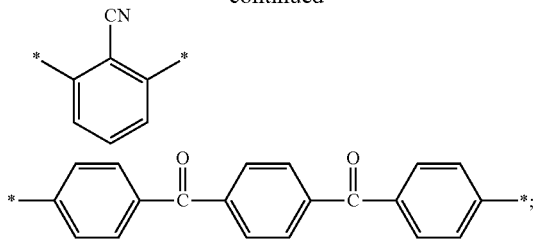

Ar$^2$ is a substituent selected from the group consisting of the following Formula 6a,

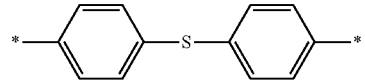

[Formula 6a]

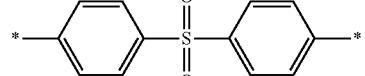

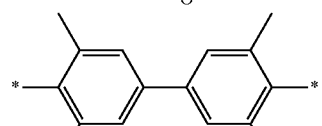

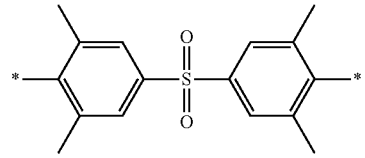

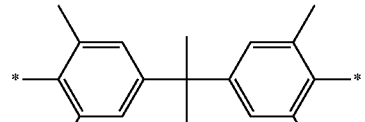

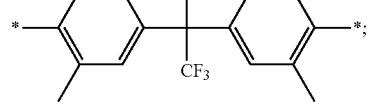

Y is independently O, S, or a chemical bond;
n is an integer from 10 to 99; and
m is an integer from 1 to 100.

10. The method of claim 9, wherein the dihalide oligomer is coupling-polymerized in an amount of 0.01 to 1 equivalent weight with respect to 1 equivalent weight of the dihalide monomer.

11. The method of claim 9, wherein the coupling polymerization is conducted in the presence of at least one solvent selected from the group consisting of dimethylacetamide, N-methylpyrrolidone, dimethylformamide, dimethyl sulfoxide, methylene chloride, chloroform, tetrahydrofuran, benzene, toluene, and xylene.

12. The method of claim 9, wherein $R^a$ to $R^d$ are all hydrogen.

13. The method of claim 12, further comprising:
   sulfonating the polymer obtained by the coupling polymerization to introduce at least one —SO$_3$R group into the polymer, wherein R is hydrogen, alkyl having 1 to 20 carbon atoms, alkoxy having 1 to 20 carbon atoms, aryl having 6 to 18 carbon atoms, or acyl having 1 to 20 carbon atoms.

14. The method of claim 13, wherein R is hydrogen.

15. The method of claim 14, wherein sulfonation of the polymer obtained by the coupling polymerization is conducted in the presence of at least one sulfonic acid compound selected from the group consisting of concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP).

16. The method of claim 12, further comprising:
sulfonating the dihalide monomer to introduce at least one —$SO_3R$ group into the dihalide monomer,
wherein R is hydrogen, alkyl having 1 to 20 carbon atoms, alkoxy having 1 to 20 carbon atoms, aryl having 6 to 18 carbon atoms, or acyl having 1 to 20 carbon atoms.

17. The method of claim 16, wherein R is alkyl having 1 to 20 carbon atoms, alkoxy having 1 to 20 carbon atoms, aryl having 6 to 18 carbon atoms, or acyl having 1 to 20 carbon atoms.

18. The method of claim 17, further comprising:
eliminating R from the dihalide monomer to introduce at least one —$SO_3H$ group into the dihalide monomer prior to the coupling polymerization.

19. The method of claim 17, further comprising:
eliminating R from the polymerized polymer to introduce at least one —$SO_3H$ group into the polymer after the coupling polymerization.

20. The method of claim 18, wherein the removal of R to introduce at least one —$SO_3H$ group is conducted in the presence of at least one compound selected from the group consisting of lithium bromide (LiBr), pyridine hydrochloride, sodium nitrate, and sodium nitrite.

21. The method of claim 19, wherein the removal of R to introduce at least one —$SO_3H$ group is conducted in the presence of at least one compound selected from the group consisting of lithium bromide (LiBr), pyridine hydrochloride, sodium nitrate, and sodium nitrite.

22. A polymer electrolyte membrane for a fuel cell comprising the polymer of claim 4.

23. The polymer electrolyte membrane for a fuel cell of claim 22, wherein the polymer electrolyte membrane further comprises at least one polymer selected from the group consisting of polyimide, polyether ketone, polysulfone, polyether sulfone, polyether ether sulfone, polybenzimidazole, polyphenylene oxide, polyphenylene sulfide, polystyrene, polytrifluorostyrene sulfonic acid, polystyrene sulfonic acid, polyurethane, and branched sulfonated polysulfone ketone copolymer.

24. The polymer electrolyte membrane for a fuel cell of claim 22, wherein the polymer electrolyte membrane further comprises at least one inorganic substance selected from the group consisting of silicon dioxide ($SiO_2$), titanium dioxide ($TiO_2$), inorganic phosphate, sulfonated silicon dioxide (sulfonated $SiO_2$), sulfonated zirconium oxide (sulfonated ZrO), and sulfonated zirconium phosphate (sulfonated ZrP).

25. A membrane-electrode assembly comprising the polymer electrolyte membrane of claim 22.

* * * * *